(12) United States Patent
Huaulme et al.

(10) Patent No.: US 7,958,016 B2
(45) Date of Patent: Jun. 7, 2011

(54) METHOD AND APPARATUS FOR SPECIFYING PRODUCT CHARACTERISTICS BY COMBINING CHARACTERISTICS OF PRODUCTS

(75) Inventors: Francois Huaulme, New York, NY (US); Herbert Scott McFaddin, Yorktown Heights, NY (US); Chandrasekhar Narayanaswami, Wilton, CT (US); Marcel-Catalin Rosu, Ossining, NY (US); Danny Soroker, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 11/622,666

(22) Filed: Jan. 12, 2007

(65) Prior Publication Data
US 2008/0172308 A1    Jul. 17, 2008

(51) Int. Cl.
*G06Q 30/00* (2006.01)
(52) U.S. Cl. ...................................... 705/26.1; 705/27.1
(58) Field of Classification Search .................... 705/26, 705/27
See application file for complete search history.

(56) References Cited

U.S. PATENT DOCUMENTS

| | | | |
|---|---|---|---|
| 4,261,012 A | | 4/1981 | Maloomian |
| 5,548,519 A | | 8/1996 | Park et al. |
| 6,728,706 B2 * | | 4/2004 | Aggarwal et al. ..................... 1/1 |
| 7,228,283 B1 * | | 6/2007 | Hornstein ....................... 705/10 |
| 7,315,833 B2 * | | 1/2008 | Schrenk ..................... 705/26.62 |
| 2001/0044758 A1 * | | 11/2001 | Talib et al. ....................... 705/27 |
| 2005/0080648 A1 * | | 4/2005 | Huelsman et al. ................. 705/1 |
| 2005/0177463 A1 * | | 8/2005 | Crutchfield et al. ............ 705/27 |
| 2005/0261989 A1 * | | 11/2005 | Vadon et al. .................... 705/27 |
| 2006/0218156 A1 * | | 9/2006 | Schechinger et al. ........ 707/100 |
| 2007/0022020 A1 * | | 1/2007 | Bernstein ........................ 705/26 |
| 2007/0219960 A1 * | | 9/2007 | Vadon et al. ...................... 707/3 |
| 2010/0153187 A1 * | | 6/2010 | Ghani et al. .................... 705/10 |

FOREIGN PATENT DOCUMENTS

| | | |
|---|---|---|
| KR | 10-2004-0107816 | 12/2004 |
| KR | 10-2006-0027559 | 3/2006 |
| WO | WO2004/004506 | 1/2004 |

OTHER PUBLICATIONS

"Beyond Text Search", PR Newswire May 6, 1996, p. 506SJM006.*
English Abstract for Publication No. 10-2004-0107816.
English Abstract for Publication No. 10-2006-0027559.

* cited by examiner

*Primary Examiner* — Yogesh C Garg
*Assistant Examiner* — Matthew Zimmerman
(74) *Attorney, Agent, or Firm* — F. Chau & Associates, LLC; William J. Stock, Esq.

(57) ABSTRACT

A computer-implemented method for specifying the characteristics of a desired item includes specifying a plurality of items, each of which possess at least one but not all characteristics of the desired item, selecting a subset of characteristics from each of said plurality of items, combining selected subsets of characteristics into a characterization of the desired item, and validating an availability of the desired item.

20 Claims, 7 Drawing Sheets

Selection of Product Features

|  | Polo Shirt A | Shirt B | T-Shirt C | Polo Tennis D | Desired Shirt |
|---|---|---|---|---|---|
| *Color* | ○ yellow | ◉ red | ○ green | ○ red | [ red ] |
| *Size* | ◉ 6 | ○ 4 | ○ 36-46 lbs | ○ small | [ 6 ] |
| *Fabric* | ○ Foot Locker | ○ Toytown | ◉ Mermaids | ○ Sleepover | [ Mermaids ] |

[ Clear ]  — — — — — — — — —  [ Check Availability ]

FIG. 4

The Desired Product was Found!

*Product Name*     Girls' Baby Pique Polo - Mermaid Tea

*Manufacturer*     Cherokee®

*Color*            Red

*Size*             6

*Fabric*           Mermaids

- - - - - - - - - - - - - - - - - - - - - - -

*Availability*     Store X, Store Y,
                   Wharehouse for Home Delivery

[Reset]   [Go Back]   [Order Product]

FIG. 5

Ordering Information

Product Name: Girls' Baby Pique Polo - Mermaid Tea

Quantity: [2]

Store Pick-up ⊙  Home delivery ○

⊙ Store X    ○ Store Y

Address Line 1: [ ]
Line 2: [ ]

City: [ ]    State: [ ]
Zip: [ ]

Payment info: ⊙ In Store    ○ Credit Card

Credit Card info:
○ MC
○ Visa
○ Amex

Account No: [ ]
Expiration Date: [ ]

[Reset]    [Go Back]    [Order Product]

FIG. 6

METHOD AND APPARATUS FOR SPECIFYING PRODUCT CHARACTERISTICS BY COMBINING CHARACTERISTICS OF PRODUCTS

BACKGROUND OF THE INVENTION

1. Technical Field

The present invention relates to a system and method for specifying a product, and more particularly to a system and method for specifying or selecting a product by combining characteristics of other products.

2. Description of Related Art

In order to limit inventory and save store space many retailers such as furniture outlets, home improvement or department stores, etc., keep only a limited number of product types in their stores. For these products, a store may stock only representative items for each product offered. However, for seasonal or unpopular products, no stock may be on hand. In other cases, for example, furniture, while it may be possible to manufacture combinations of wood veneer and fabric that are not in the catalog, such combinations may not be offered as a choice to the shopper due to inflexible ordering methods.

As a result of these shortcomings, consumers sometimes cannot find the item they need although similar items are available on the shelf. For example, a store may have jackets that are large and jackets that are small, and jackets that are red and jackets that are blue, but not of a desired combination, for example, a large red jacket. In another example a couch may be available in either a mahogany frame and maroon colored leather or a pine frame and peach colored leather in the store but a couch with mahogany frame and peach colored leather may not be in the store.

Therefore, a need exists for a system and method for specifying an item using characteristics of other items.

SUMMARY OF THE INVENTION

According to an embodiment of the present disclosure, a computer-implemented method for specifying the characteristics of a desired item includes specifying a plurality of items, each of which possesses at least one but not all characteristics of the desired item, selecting a subset of characteristics from each of said plurality of items, combining selected subsets of characteristics into a characterization of the desired item, and validating an availability of the desired item.

According to an embodiment of the present disclosure, a computer system for specifying the characteristics of a desired item includes a memory storing computer readable code, and a processor for executing the computer readable code to perform a method. The method includes specifying a plurality of items, each of which possesses at least one but not all characteristics of the desired item, the computer system further comprising means for specifying the plurality of items, selecting a subset of characteristics from each of said plurality of items, the computer system further comprising a display for displaying the subset of characteristics and enabling user interaction to make a selection, combining selected subsets of characteristics into a characterization of the desired item, and validating an availability of the desired item.

BRIEF DESCRIPTIONS OF THE DRAWINGS

Preferred embodiments of the present disclosure will be described below in more detail, with reference to the accompanying drawings:

FIG. 4 is a workstation screen showing the method for selecting the characteristics of the desired product according to an embodiment of the present disclosure.

FIG. 5 is a workstation screen showing the characteristics and availability of the desired product according to an embodiment of the present disclosure.

FIG. 6 is a workstation screen showing the method for ordering the desired product according to an embodiment of the present disclosure.

DETAILED DESCRIPTION OF PREFERRED EMBODIMENTS

According to an embodiment of the present disclosure, a method executable in a store setting allows a user to compose features of a target/desired product by selecting subsets of features from two or more other products that are retrieved from a catalog by associating a code or physical artifact corresponding to the other products.

Embodiments of the present disclosure allow consumers or salespersons to specify the characteristics of the desired product starting from those of available products or from products with which the user is familiar. Using the same apparatus, the consumer can order the product with the desired characteristics in a desired quantity for home or store delivery, or buy or put them on hold at a different store, and have them picked up later, possibly by a different person, such as a friend.

Since certain product characteristics are difficult to identify even by store clerks, especially for product lines with a short life time, a system or method according to an embodiment of the present disclosure may reduce the time needed to correctly identify the desired product and its availability. Further, a consumer may but the desired product once identified, if available now from a different store or a remote warehouse.

Specifying the characteristics of the target product can be done by combining the characteristics of several observed products, one or more of which may be present in the store or present in the store catalog or information system. To make an informed decision, it is important for the customer to have direct access or a previous experience with the observed products that are used to compose the characteristics of the target product. The observed products used to compose the characteristics of the target product may be found in the same retail location as the target product. Therefore, the most appropriate location for the composition of product characteristics into the desired product is considered to be the retail location or store. In such a location, the composition of product characteristics is performed using a workstation or kiosk and zero or more mobile computing devices.

Figure 1:
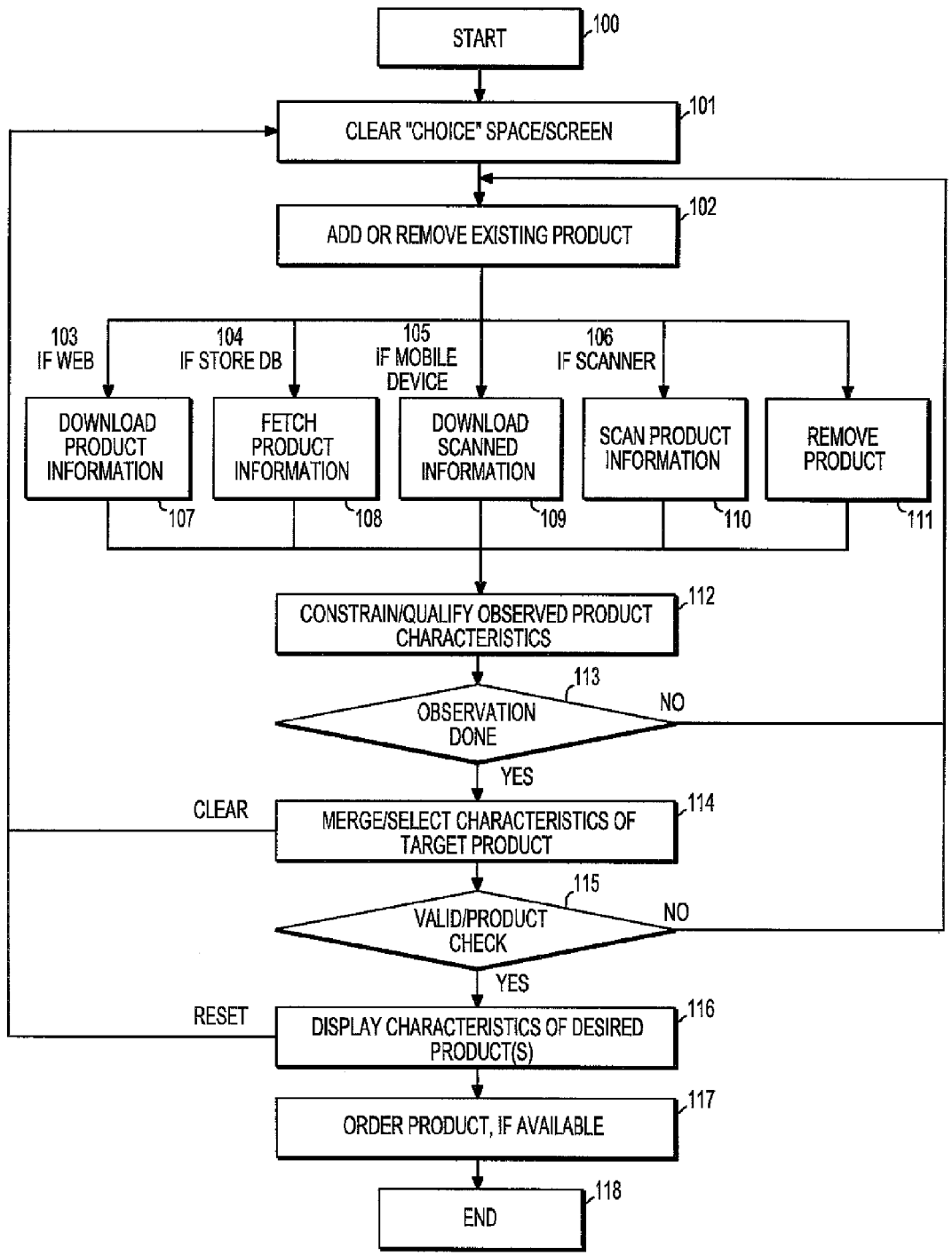
FIG. 1 is block/flow diagram showing the method for specifying product characteristics by combining characteristics of known products according to an embodiment of the present disclosure.

FIG. 1 shows the block/flow diagram for specifying product characteristics of a target product by combining characteristics of observed products. At block 100 the method is initialized, e.g., a mobile device is provided to a user, and at block 101 a workstation screen is cleared. At block 102 the customer selects the source of information for a next observed product to be considered. Possible sources of observed product information are the World-Wide Web 103, a store database 104, products scanned using a mobile device 105 and products scanned using a scanner attached to the workstation 106. For each observation, the characteristics of the observed product are introduced in the workstation at blocks 107, 108, 109 and 110, respectively. These characteristics may be displayed as specifications of one or more items matching the characteristics of the source information. The display may be, for example, on a display screen of a mobile device. To avoid overloading the screen, one or more products, together with their characteristics, can be removed from the screen at block 111.

Each observation of a physical product can yield a number of characteristics. Typically, the user is only focusing on a limited set of characteristics. For example, the characteristic of color of an observed shirt may be important but the characteristics of texture, cloth or collar style may not be important. In block 112, the characteristics of the observed product may be constrained by selection of only the desired characteristics. A number of different characteristics may be selected, see block 113. Additionally, the characteristics of the observed product may be further logically qualified. For example, the user may choose the observed product to illustrate a product feature that is not desired, to illustrate a product feature that is only approximate, or illustrate a combination of products using logical operators, e.g., OR, XOR and the like. Both the constraint and the qualification of the characteristics of the observed product may be performed manually or automatically. For example, the system may be configured as a color selection station, in which case observations of products will be automatically constrained to the characteristic of color. The automatic constraint or qualification process may be configured via a set of system configurations or rules.

The output of block 112 is a set of candidate assertions about the characteristics of the target product. For example, observation of a shirt—call it "Shirt A"—may yield the following assertions:
   COLOR LIKE RED
   SIZE EQUALS LARGE
   COLLAR EQUALS WIDE
   FABRIC EQUALS COTTON
Observation of a second shirt—call it "Shirt B"—may yield the following assertions:
   COLOR EQUALS BLUE
   SIZE EQUALS LARGE
   COLLAR NOT WIDE
   FABRIC EQUALS SILK
Subsequently, the user will select which of these assertions to apply to the target product.

The observation process is repeated for each of the products the customer wishes to use as input for the characteristics of the target product.

According to an exemplary embodiment of the present disclosure, in the iterative blocks, a product may be introduced using choices 105 or 106, e.g., by scanning the product's tag using a scanner attached to a mobile device or directly to the workstation/kiosk.

In block 114, the assertions about the characteristics for the observed products introduced in a previous iteration are collected. Assertions about characteristics are grouped by type and compared. In the above example, there are four groups of assertions corresponding to the characteristics of COLOR, SIZE, COLLAR, and FABRIC.

For each characteristic, the available assertions are merged, selected or left undetermined. Merged characteristics are ones that have been completely determined by the observation. In the example, the SIZE characteristic above is automatically determined to be LARGE, since both shirt A and shirt B are LARGE. The user may additionally determine characteristics at this point by viewing the assertions in a table displayed on a user interface (see FIG. 4) and selecting the desired ones. For example, the user may select "COLOR LIKE RED". The user may also choose to ignore observed assertions about the characteristics, for example, "COLLAR" may be set to take any value. Any unselected assertions may be treated by default as, for example, a logical disjunction ("OR"). For example, the system can infer that "FABRIC EQUALS SILK OR FABRIC EQUALS COTTON". The logical function may be selected by the user.

Additionally, the user may directly specify product characteristics that are not input from the observation process.

In block 115, the system performs a product check. The product check may include validating the availability of the product, which includes but is not limited to searching for existence or technical viability for made-to-order products, searching for availability in a remote location, for example, under conditions of location or convenience, and searching for desirability, for example, against a set of user preferences.

If such one or more target products with the desired characteristics are found in block 115, they are displayed in block 116. One or more of these target products can be selected and ordered in block 117, and the workstation screen is reset for the next customer or product in block 118.

Figure 2:
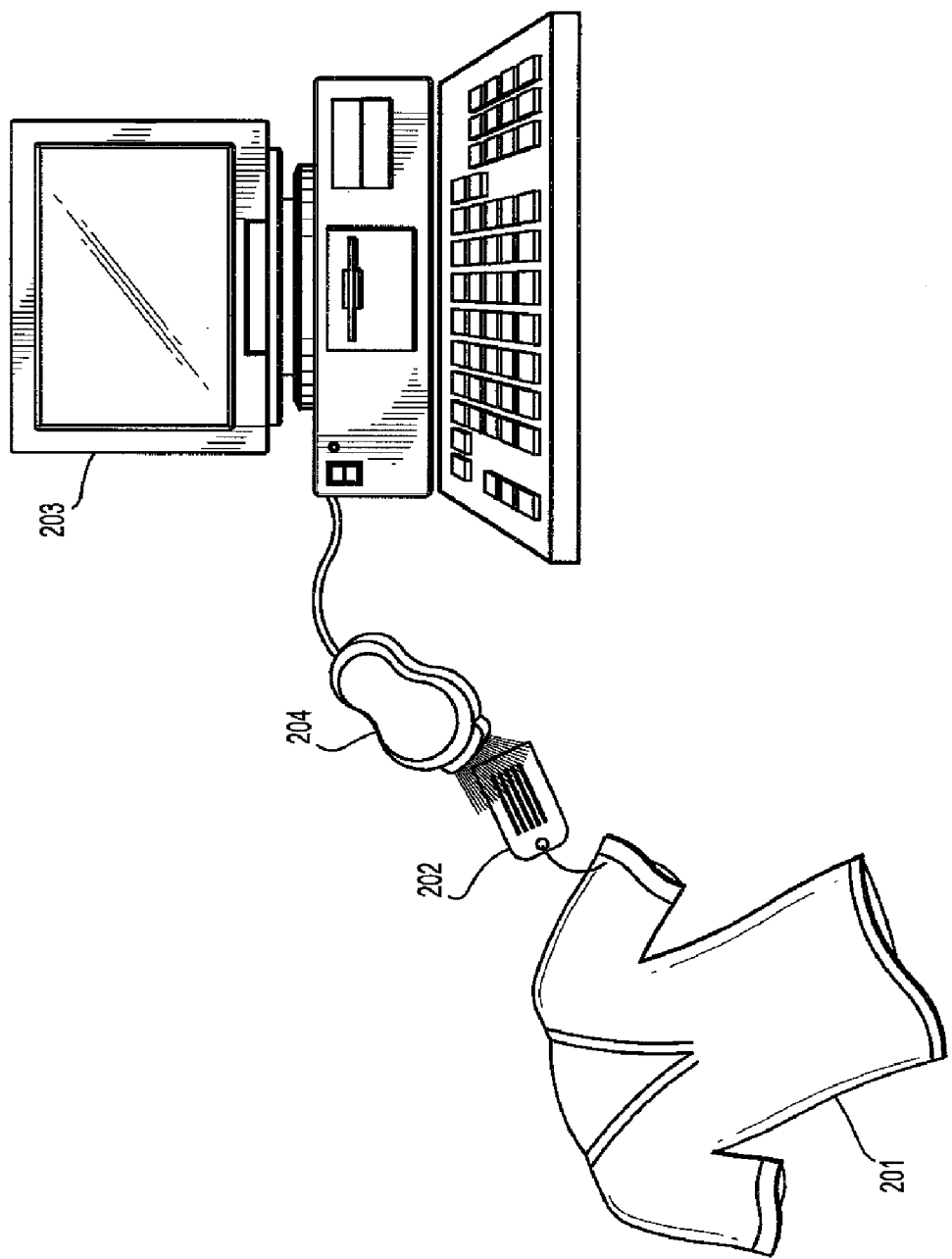
FIG. 2 illustrates the in-store collection of product characteristics at the workstation according to an embodiment of the present disclosure.

FIG. 2 shows an exemplary action of scanning a tag 202 of store item 201 using the scanner 204 directly attached to the workstation/kiosk 203.

Figure 3:
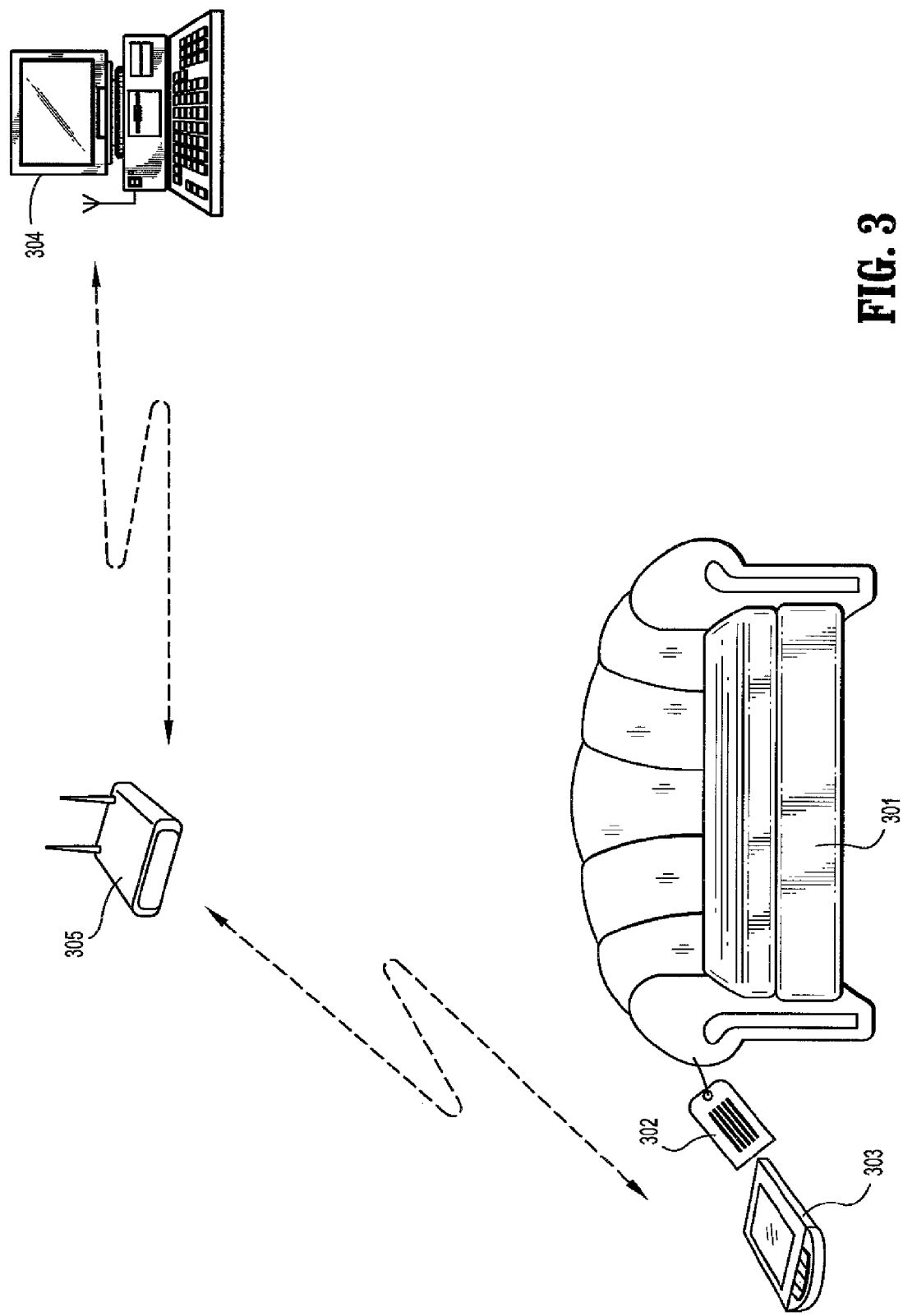
FIG. 3 illustrates the in-store collection of product characteristics using a wireless-connected mobile device according to an embodiment of the present disclosure.

FIG. 3 shows an exemplary action of scanning of a tag 302 attached to an item 301, e.g., a couch, using a scanner attached to mobile device 303. The scanned information is transferred to workstation/kiosk 304 via a wireless technology, such as the IEEE 802.11 standard, using a wireless access point 305. The scanned information is handled by a computer program implemented on the mobile device and it is either transferred to the workstation 304 immediately, if the user of the mobile device has the ownership of the screen of workstation 304, or stored on the mobile device for transfer when the user acquires the ownership of the workstation screen 304.

FIG. 4 shows the workstation screen used to select the characteristics of the desired target product, which are in the rightmost column. The characteristics of the observed products introduced in blocks 107-110 are listed in individual columns, one characteristic per line. Each column corresponds to one of the observed products introduced previously.

The characteristics are matched by type. FIG. 5 shows the workstation screen for the case when exactly one product with the desired characteristics is found. The last line shows the product as available for pick-up from two different stores (X and Y) and for home delivery from the warehouse. If multiple products are found, each one may be displayed in a separate column, or in separate screens, all but one screen with an additional "next" button at the bottom.

FIG. 6 shows the workstation screen used for ordering one of the desired products, selected using the screen in FIG. 5. In addition to commonly found fields, such as home address and payment information, the user may select to pick-up the product from one of the stores in the vicinity. Such a selection, if confirmed, guarantees the availability of the product for pick-up by the customer for the next NN hours (for example the next 24 hours).

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 7:
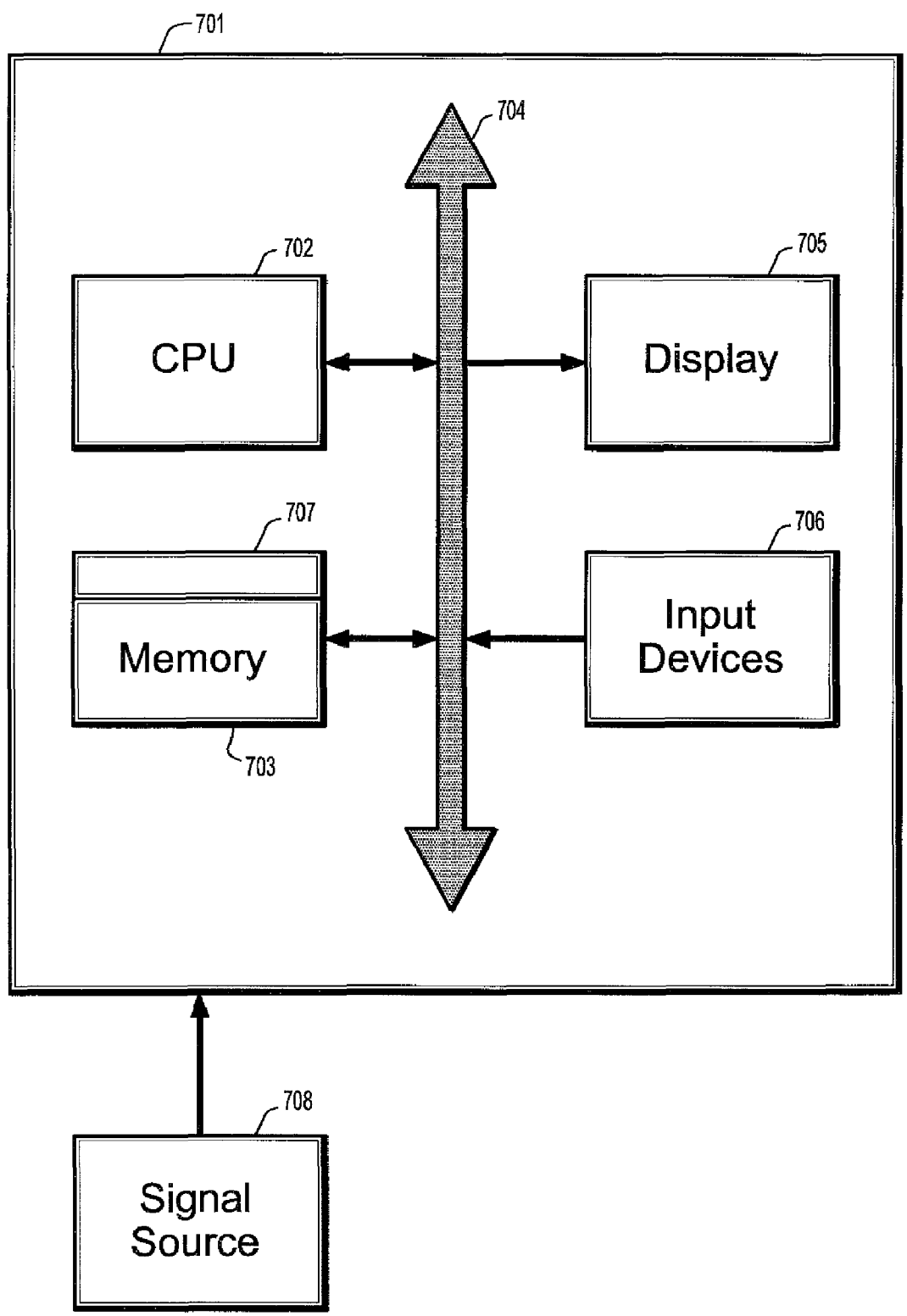
FIG. 7 is a diagram of a computer system for according to an embodiment of the present disclosure.

Referring to FIG. 7, according to an embodiment of the present invention, a computer system 701, for example, the mobile device or workstation/kiosk, for facilitating an item selection based on characteristics selected from other items can comprise, inter alia, a central processing unit (CPU) 702, a memory 703 and an input/output (I/O) interface 704. The computer system 701 is generally coupled through the I/O interface 704 to a display 705 and various input devices 706 such as a mouse and keyboard. The support circuits can include circuits such as cache, power supplies, clock circuits, and communications bus. The memory 703 can include random access memory (RAM), read only memory (ROM), disk drive, tape drive, or a combination thereof. The present invention can be implemented as a routine 707 that is stored in memory 703 and executed by the CPU 702 to process the signal from the signal source 708. As such, the computer system 701 is a general-purpose computer system that becomes a specific-purpose computer system when executing the routine 707 of the present invention.

The computer platform 701 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a system and method for specifying or selecting a product by combining characteristics of other products, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A computer-implemented method for specifying characteristics of a desired item using items different from the desired item comprising:
    receiving, by a computer system, a specification comprising a plurality of items, each of which possess at least one but not all characteristics of the desired item;
    outputting, by the computer system, a plurality of candidate assertions for each of the plurality of items, wherein the candidate assertions correspond to the characteristics of the plurality of items;
    receiving, by the computer system, a selection of the candidate assertions for each of the plurality of items of the specification, the selection corresponding to a subset of characteristics, wherein the subset of characteristics includes at least one characteristic of each of said plurality of items;
    combining, by the computer system, the subset of characteristics selected from the candidate assertions for each of the plurality of items of the specification into a characterization of the desired item, wherein the desired item is not an item in the specification comprising the plurality of items;
    determining, by the computer system, whether the desired item is available for purchase based on the characterization.

2. The computer-implemented method of claim 1, wherein the computer system comprises a mobile device comprising a component of the computer-implemented method embodied in computer-readable code running on the mobile device.

3. The computer-implemented method of claim 2, wherein the component running on the mobile device displays a specification of an item matching the subset of characteristics.

4. The computer-implemented method of claim 3, wherein the component running on the mobile device stores the specification of the item matching the subset of characteristics.

5. The computer-implemented method of claim 1, wherein at least one of the plurality of items is specified by reading a bar code.

6. The computer-implemented method of claim 1, wherein at least one of the plurality of items is specified by reading an RFID tag.

7. The computer-implemented method of claim 1, wherein at least one of the plurality of items is specified by entering a product identifier.

8. The computer-implemented method of claim 1, wherein at least one of the plurality of items is specified by selecting it from a list of text entries or images.

9. The computer-implemented method of claim 1, wherein the selected subsets of characteristics of a specified item are constrained to match a set of characteristics of the desired item.

10. The computer-implemented method of claim 9, wherein constraints are specified by user input.

11. The computer-implemented method of claim 9, wherein constraints are specified by predetermined rules and patterns.

12. The computer-implemented method of claim 1, wherein invalid combinations are indicated.

13. The computer-implemented method of claim 1, wherein validity is continuously determined while a user is specifying the subset of characteristics.

14. The computer-implemented method of claim 1, wherein at least one characteristic of the subset of characteristics is one of material, size, color, finish, sheen, shape, weight, flavor, smell, density, opacity, country of origin, recycleability, warranty period and time to availability.

15. The computer-implemented method of claim 1, further comprising processing the characterization of the desired item based on assertions received by the computer system.

16. The computer-implemented method of claim 1, receiving a purchase order for purchasing the desired item.

17. The computer-implemented method of claim 1, wherein the desired item can be purchased from a plurality of locations and shipped to one among a plurality of locations.

18. The computer-implemented method of claim 1, further comprising rendering, by the computer system, the desired item, wherein the desired item can be viewed from a plurality of viewpoints and lighting conditions in a plurality of virtual environments.

19. The computer-implemented method of claim 1, further comprising providing haptic feedback by the computer system.

20. A computer system for specifying characteristics of a desired item using items different from the desired item comprising:
- a memory storing computer readable code; and
- a processor configured to execute the computer readable code to perform a method comprising:
  - receiving a specification comprising a plurality of items, each of which possess at least one but not all characteristics of the desired item;
  - outputting a plurality of candidate assertions for each of the plurality of items, wherein the candidate assertions correspond to the characteristics of the plurality of items;
  - receiving a selection of the candidate assertions for each of the plurality of items of the specification, the selection corresponding to a subset of characteristics, wherein the subset of characteristics includes at least one characteristic of each of said plurality of items of the specification, the computer system further comprising a display for displaying the subset of characteristics and enabling user interaction to make a selection;
- combining the subset of characteristics selected from the candidate assertions for each of the plurality of items of the specification into a characterization of the desired item, wherein the desired item is not an item in the specification comprising the plurality of items; and
- determining, whether the desired item is available for purchase based on the characterization.

* * * * *